United States Patent
Hiltunen et al.

(10) Patent No.: US 6,814,940 B1
(45) Date of Patent: Nov. 9, 2004

(54) PROCESS FOR PYROLYZING CARBONACEOUS FEEDSTOCKS

(75) Inventors: Jyrki Hiltunen, Sipoo (FI); Steven Gust, Porvoo (FI); Jukka-Pekka Nieminen, Porvoo (FI)

(73) Assignee: Fortum Oyj, Espoo (FI)

( * ) Notice: Subject to any disclaimer, the term of this patent is extended or adjusted under 35 U.S.C. 154(b) by 0 days.

(21) Appl. No.: 09/623,018

(22) PCT Filed: Feb. 26, 1999

(86) PCT No.: PCT/FI99/00153
§ 371 (c)(1),
(2), (4) Date: Oct. 30, 2000

(87) PCT Pub. No.: WO99/43768
PCT Pub. Date: Sep. 2, 1999

(30) Foreign Application Priority Data

Feb. 27, 1998 (FI) ................................................ 980456

(51) Int. Cl.⁷ .............................. B01J 8/18; B01J 8/26
(52) U.S. Cl. ...................... 422/141; 422/144; 422/145; 422/147; 422/190; 48/62 R; 48/89; 48/111; 48/119; 48/198.6; 48/209
(58) Field of Search ................................ 422/139, 140, 422/141, 142, 144, 145, 146, 147, 190, 191; 48/62 R, 89, 111, 119, 209, 198.6; 110/235, 238, 242, 243, 244, 245, 255

(56) References Cited

U.S. PATENT DOCUMENTS

| | | | |
|---|---|---|---|
| 2,515,155 A | * | 7/1950 | Munday ........................ 55/343 |
| 2,525,925 A | | 10/1950 | Marshall ...................... 208/147 |
| 2,689,787 A | * | 9/1954 | Ogorzaly et al. .............. 48/76 |
| 3,148,227 A | | 9/1964 | Hearon et al. ............... 585/538 |
| 4,032,305 A | * | 6/1977 | Squires ........................... 48/73 |
| 4,101,412 A | | 7/1978 | Choi ............................ 208/411 |
| 4,152,393 A | | 5/1979 | Callahan et al. ............. 422/144 |
| 4,344,770 A | | 8/1982 | Capener et al. ............... 44/388 |
| 6,045,688 A | | 4/2000 | Ruottu et al. ................ 208/113 |
| 6,200,534 B1 | * | 3/2001 | Ruottu ........................ 422/145 |

FOREIGN PATENT DOCUMENTS

| | | |
|---|---|---|
| CA | A1163595 | 3/1984 |
| CA | A1241541 | 9/1988 |
| CA | C1283880 | 5/1991 |
| DE | A1-3217422 | 11/1983 |
| WO | A1-9808600 | 3/1998 |

\* cited by examiner

Primary Examiner—Hien Tran
Assistant Examiner—Jennifer A. Leung
(74) Attorney, Agent, or Firm—Birch, Stewart, Kolasch & Birch, LLP

(57) ABSTRACT

The present invention concerns a process and an apparatus for thermal conversion of biomass and organic wastes. According to the invention, the feedstock is fed into a fluidized-bed reactor, wherein the feed is converted at an elevated temperature under the influence of particulate matter kept in a fluidized state by a fluidizing gas, the particulate matter is transferred from the reactor to a regenerator for regeneration and then recirculated to the reactor after the regeneration, and the converted hydrocarbon products are recovered from the reactor. Both the reactor and the regenerator comprise risers having an axially annular cross section and being equipped with multi-inlet cyclones for the separation of particulate matter. By means of the invention, it is possible to producer pyrolysis oil, the quality of which is higher than that of oil produced with the processes of the prior art. The incorporation of multi-inlet cyclones into the reactor configuration reduces gas velocities, reduces the physical size of the cyclone and shortens the residence time of gases in the cyclone.

7 Claims, 2 Drawing Sheets

PROCESS FOR PYROLYZING CARBONACEOUS FEEDSTOCKS

This application is the national phase under 35 U.S.C. § 371 of PCT International Application No. PCT/FI99/00153 which has an International filing date of Feb. 26, 1999, which designated the United States of America.

BACKGROUND OF THE INVENTION

1. Field of the Invention the present invention relates to thermal conversion processes, in particular to pyrolysis of carbonaceous feedstocks, such as biomass and organic wastes. According to the process, the carbonaceous material is fed into a reactor, wherein the feedstock is converted at moderate temperature in the presence of a heat transfer medium comprising particulate matter. The particulate matter is kept in fluidized state by a fluidizing gas. After pyrolysis, the particulate matter is separated from the hydrocarbon products, it is regenerated by combustion and recirculated to the reactor. The products of the pyrolysis comprise solids, liquids and/or gases which are recovered from the reactor. Optionally the products are subjected to further processing steps, for example by condensation of the vaporized hydrocarbons.

2. Description of Related Art

The continuing and increasing concern of society for environmental problems related to fossil fuel use and disposal of waste materials has led to increased research into and development and commercialization of a wide variety of technologies which aim to enhance the collection, processing and use of materials in an environmentally responsible manner.

At present the expanded use of organic based materials from solid waste streams and forestry residues or purpose grown crops is hindered by the relatively high costs in comparison to the existing infrastructure for employing fossil fuel systems. These high costs are due to both higher feedstock costs and higher conversion costs. The higher conversion costs are related to the well known problem of economy of scale, which is caused by the wide distribution of raw materials which leads to high costs for collection and transport. In terms of biomass conversion, the main goal is to increase the energy concentration in the final product so as to minimize costs during use. Liquids are also preferred due to the ease of handling, shipping and storing as well as because of their favorable characteristics of use.

In general terms, pyrolysis is a thermal degradation process in which large molecules are broken or cracked into smaller molecules. It can be used to convert a variety of solid or liquid materials into a more readily useable form, and it has, in fact, been employed for the production of charcoal and high viscosity tars from biomass for centuries. The process can be described as a thermal cracking or a depolymerization process in the absence or near absence of oxygen. During the past 10–20 years, the technology has been modified to maximize liquid yields by increasing the heating rate to over 1000° C./second, reducing the vapour residence time to under 15 seconds and improving the product recovery with a fast quench.

Depending on the feedstock, conventional pyrolysis equipment comprises a drier for the raw material, optionally a mechanical grinder for size reduction, a feed system, a reactor, cyclones for solids removal from the vapour stream, char combustor to provide heat for the reaction and pots for solids removal and recovery system. In addition, a char combustor for process heat is often included. The reactors operate at a slight overpressure.

The above-described process equipment is used for thermal conversion known as "flash" or "fast" pyrolysis. When applied to small biomass particles (<5 mm thick) and temperatures of 400 to 700° C., liquid yields are as high as 65 to 75 wt-%. The other products of the process are char (10 to 15 wt-%) and non-condensable gases such as methane $CH_4$, carbon monoxide CO and carbon dioxide $CO_2$ (10 to 15 wt-%).

The ratio of solids to liquids to gases is determined by both the heating rate and maximum temperature and generally it depends on the specific feedstock. If liquid products are to be maximised it is generally known in the art that intermediate temperatures in the range of 400 to 600° C. and relatively short residence times from 0.5 to 5 seconds are most advantageous. These process conditions lead to high yields, on the order of 65 to 75 weight % of the feedstock.

In the art, heat for the endothermic pyrolysis reaction is produced in a separate boiler or regenerator by combusting the uncondensable gases, tar and combustible solids produced in the process. Heat is transferred from the boiler to the reactor by solid particles, e.g. sand. After the chemical reaction the solids may be covered by tar which is combusted in the boiler. Solids (combustible and sand) are generally removed from the gas stream by one or more cyclones, which are placed following the reactor.

Processes for pyrolysis of carbonaceous materials and equipments used in the processes are discussed in the following patents:

W. M. Hearon et. al, "Preparation of Unsaturated Hydrocarbons from Oxygen Containing Organic Materials" U.S. Pat. No. 3,148,227 Issued Sep. 8, 1964

C. K. Choi, "Process and Apparatus for Rapid Pyrolysis of Carbonaceous Materials" U.S. Pat. No. 4,101,412 issued Jul. 18, 1978

E. L. Capener, M. Low, "Method and Apparatus for converting Solid Organic Material to Fuel Oil and Gas" U.S. Pat. No. 4,344,770 issued Aug. 17, 1982

E. Chornet, C. Roy, "Organic Products and Liquid fuels from Lignocellulosic Materials by Vacuum Pyrolysis" Canadian Patent No. 1,163,595 issued Mar. 13, 1984

D. S, Scott "Pyrolysis Process for Biomass" Canadian Patent No. 1,241,541 issued Jun. 6, 1988

D. A, Berg, "Method and Apparatus for Rapid Thermal Processing" Canada Patent No. 1,283,880 issued May 5, 1991

The present technology is hampered by some significant problems. Thus, in order to achieve high product quality it is necessary to remove as high percentage of solids from the gases as possible prior to condensation. Solids remaining in the liquid product significantly reduce product quality by clogging small passages in pumps, fuel lines and nozzles and are also suspected to lead to increased polymerization and subsequent increase in viscosity of the liquid fuel.

In the above-mentioned related art, the conventional cyclones and separate reactors and regenerators used have serious limitations restricting their utilization in biomass pyrolysis processes. Thus, the solids are subjected to high velocities in traditional cyclones, which leads to high attrition of both solids and construction materials. The required equipment is large and heavy. Outer surfaces are large, which causes large radiation losses. Vertical distances for solids transport are long, which requires expensive process control equipment.

SUMMARY OF THE INVENTION

It is an object of the present invention to eliminate the problems of the prior art and to provide a novel process for pyrolysis of biomass, organic wastes and similar carbonaceous feedstocks.

It is another object of the present invention to provide a novel apparatus for pyrolysis of the afore-mentioned materials.

These and other objects, together with the advantages thereof over known processes, which shall become apparent from specification which follows, are accomplished by the invention as hereinafter described and claimed.

The present invention is based on using a reaction system utilizing at least two internally concentrically arranged cylindrical chemical or physical conversion circulating fluidized bed reactors or thermal regenerators comprising multi-inlet cyclones which permits thermal conversion or pyrolyzation of carbonizable material into a number of liquid, solid and gaseous products.

In particular, the process according to the present invention comprises pyrolysing biomass or organic wastes at temperatures in excess of 400° C. in an apparatus including a reactor with a riser having an axially annular cross section and being equipped with a multi-inlet cyclone for the separation of particulate matter, and a regenerator with a riser having an axially annular cross section and being concentrically fitted in respect of the reactor used, said regenerator also being equipped with a multi-inlet cyclone for separation of regenerated particulate matter. According to the invention, the dipleg of the regenerator communicates with the riser of the reaction unit and with the drying unit.

More specifically, the process according to the present invention comprises (a) feeding the feedstock(s) into a fluidized-bed reactor, wherein the feedstock is converted to hydrocarbon products at an elevated temperature under the influence of particulate matter kept in a fluidized state by a fluidizing gas, (b) transferring the particulate matter from the reactor to a regenerator for regeneration and then recirculating the particulate matter to the reactor after the regeneration, and (c) recovering the converted hydrocarbon products from the reactor, wherein said reactor comprises a riser having an axially annular cross section and is equipped with a multi-inlet cyclone for the separation of particulate matter, and wherein said regenerator is concentrically fitted around said reactor and wherein said regenerator comprises a riser having an axially annular cross section and wherein said regenerator is equipped with a multi-inlet cyclone for separation of regenerated particulate matter.

The apparatus according to the invention is as is described hereinabove for practicing the method according to the invention. The present invention achieves considerable advantages. Thus, the traditional problem of high solids content in liquid products has been minimized and it is possible to produce pyrolysis oil, the quality of which is higher than that of oil produced with the processes of the prior art. The incorporation of multi-inlet cyclones into the reactor configuration reduces gas velocities, reduces the physical size of the cyclone and shortens the residence time of gases in the cyclone. This directly leads to a reduction in the outer wall area of the hot reactors, which as a consequence leads to less material required and thus a less expensive reactor. Further, lower gas velocities cut down attrition of construction materials.

Next, the invention will be described in more detail by making reference to the appended drawings.

DETAILED DESCRIPTION OF THE INVENTION

Figure 1:
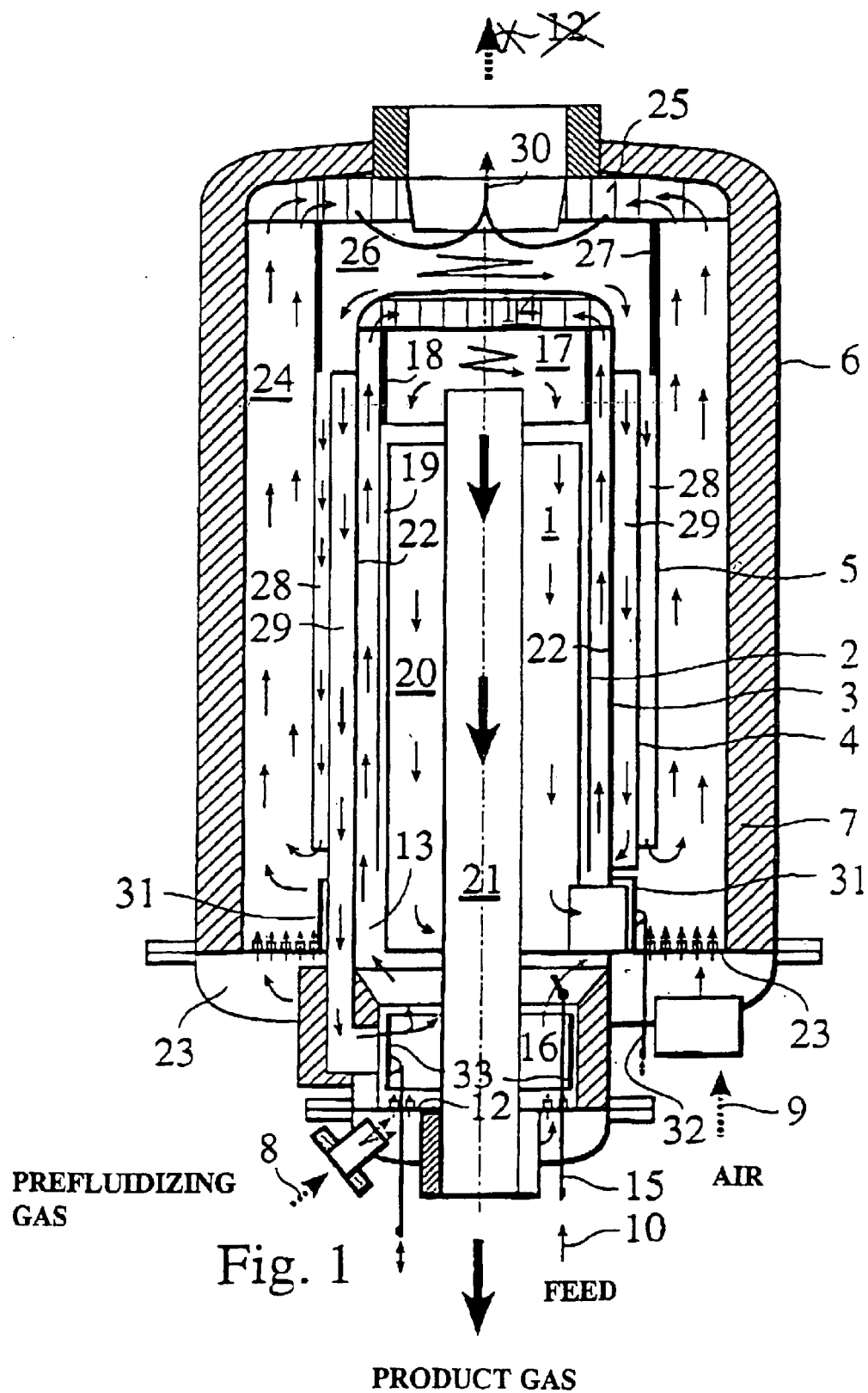
FIG. 1 shows a sectional side view of a preferred embodiment of the pyrolysis apparatus according to the present invention.

Within the scope of the present invention, the terms "thermal conversion" and "pyrolysis" will be used interchangeably to denote a thermal process in which organic material selected from biomass and organic wastes is treated at moderate or high temperatures to produce useful solid, liquid and/or gaseous products.

In the context of thermal conversion, "moderate temperatures" are temperatures in the range of about 400 to about 800° C., typically up to 600° C., whereas "high temperatures" are temperatures in excess of 800° C. The expression "an elevated temperature" covers both temperature ranges.

The terms "regenerator", "solids reheater" and "char combustor" are synonymously used for designating a reaction zone in which heat transfer particles are reheated for burning off any pyrolysis product accumulated on the surface of the particles and for increasing the heat content of the particulate matter.

The pyrolysis system of the present invention performs thermal conversion of carbonizable input material into char, condensable gases and non-condensable gases. The process comprises the steps of drying and grinding the feedstock, thermally converting or pyrolysing the feedstock in the presence of a heat transfer medium, separating products and heat transfer medium, regenerating heat transfer medium and recovering the products of the thermal conversion.

The apparatus comprises typically a feedstock feeder, a flash pyrolysis reactor, fluidizing gas input, multi inlet cyclone(s), sand reheater or regenerator, condensers and liquid storage for the liquids produced by pyrolysis.

Depending on the type and form of material, the input material is first dried to a moisture content of 5 to 25% but preferably 7 to 12%, and optionally converted to a finely divided raw material of appropriate size.

A heat transfer medium comprising solids, for example sand but it may also include catalysts, is fluidized by an essentially oxygen-free gas, such as flue gas, in a reactor space, where input material is fed. The heat transfer medium forms a fluidized bed within the reactor space. The fluidized bed can be formed in a reactor of conventional type, such as in a fluidized bed reactor, or the reactor can be a circulating fluidized bed reactor (CFBR). In the latter type the fluidizing velocities are so high that the bed surface is no longer sharply defined but replaced by a zone, wherein the solids content slowly decreases with the height. If particles are fine, this leads to fast fluidization where the solids entrainment occurs at such high rates that, in general, fast fluidized beds can only be maintained by recirculation of the entrained solids via cyclones.

According to the invention, the thermal conversion of the feedstock is performed in a circulating fluidized-bed reactor in which the reaction space, i.e., the fluidization space of the reactor comprises an intershell space of axially annular cross section remaining between two concentrically located cylinders or cones, in which space the feed is first suspended or vaporized into the fluidized bed and subsequently converted into reaction products at an elevated temperature.

The temperature, velocity and mass of the heated bed material are adjusted such that the resulting pyrolysis process maximizes the yield of the desired product. Input material is quickly heated by hot heat transfer media with residence times in the range of 0.01 to 10 seconds, preferably 0.1 to 2 seconds to a final temperature of 450 to 600° C. and is thus thermally converted or pyrolyzed into useable gases and solids.

Solids and bed material are then subsequently removed to percentage of more than 99.5% from the reaction gas by means of a multi-inlet (in the following also "multiport") cyclone, which is located directly above the axially annular reactor riser space. This arrangement makes it possible to shorten the residence time of the reaction, because a multiport cyclone offers faster and more efficient separation of particulate matter from the reaction gas flow over a single-port cyclone. From the cyclone, the particulate matter can be recirculated to a regenerator via a solids return channel, or the downward dipleg, which is formed by an intershell space of axially annular cross section remaining between two concentrically located cylinders or cones.

According to a preferred embodiment, the regenerator comprises a riser and dipleg of a construction similar to that of the above-described reactor and fitted concentrically around the reactor to provide a compact construction.

In the regenerator, the solids are then fluidized by air or another oxygen-containing gas; the char is combusted while it flows vertically with the air in the surrounding outer regenerator reactor or char combustor. Combustion raises the temperature of the bed material to the operating conditions needed in the reactor.

As mentioned above, the risers and diplegs of both the reactor and the regenerator have axially annular cross sections and are coaxially placed. According to further preferred embodiment of the invention, the drier used for pretreating the feedstock comprises a third riser with a corresponding dipleg concentrically fitted around the combined reactor and regenerator. It is possible to provide channels for internal recirculation of material within at least one of the drier, the reactor and the solids reheater as well as for providing communication between the dipleg of the drier and the riser of the solids reheater and between the dipleg of the regenerator and the riser of the reactor. The dipleg of the reactor can be combined with the risers of both the drier and the regenerator.

The pyrolysis gases produced can be channelled to a series of condensers where they are condensed with the noncondensable gases continuing returning to either the drier or the char combustor for energy recovery.

A wide variety of feedstocks can be used as input materials for the reactor system. The common denominator for the feedstock materials is that it is carbon containing or carbonaceous. These can be broken down into two main categories: biomass and wastes:

The biomass feedstock is preferably selected from forestry residues and thinnings; agricultural residues, such as straw, olive thinnings; energy crops, such as willow, energy hay, Miscanthous; and peat.

The wastes are preferably organic, solid or liquid, and they are selected from refuse derived fuel (RDF); wastes from sawmills, plywood, furniture and other mechanical forestry wastes; plastic wastes; and waste slurries (including industrial and municipal wastes).

An apparatus according to the novel construction comprises an inner reactor of axially annular riser cross section and an outer solids reheater in which contaminated and cooled solid particles can be reheated and returned back to the process. In the following description, the circulating solids are denoted by abbreviation "CS".

Turning now to FIG. 1, it can be noted that the apparatus according to the first embodiment of the present invention comprises two concentrically adapted cylindrical CS reactors, separated by an intermediate shell 22 from each other, of which the inner will later be called the "reactor" or "reaction unit" and the outer the "regenerator" or "regeneration unit".

The reactor unit is made from two or, as shown in the figure, preferably three concentrically mounted, essentially cylindrical tubes 1, 2 and 3, whose intertube spaces form spaces 20, 19 and 13 of axially annular cross section. The tubes may be made from steel or an equivalent alloy. Among these, the desired reaction is carried out in the intertube space 13. The tubes are mounted with their longitudinal axes aligned concentrically vertical. Above the axially annular riser space 13, as a continuation of cylindrical tubes 2 and 3, is mounted a multiport cyclone 17 having louvered vanes 14 fixed to its outer wall. The cyclone is provided with a center tube 21 for removal of the product gas, while transfer channels 19 and 20 are provided in the inner space of the cylindrical tube 3 for removal of the solids separated from the gaseous phase in the cyclone.

Outside the reactor outer shell, the regenerator unit comprises three concentrically mounted, essentially cylindrical tubes 4, 5 and 6, whose intertube spaces form spaces 29, 28 and 24 of axially annular cross section. Among these, solids reheating is carried out in the intertube space 24. From inside, the cylindrical tube 6, also referred to as a "pressure shell", is lined with an insulating material layer 7 in order to maintain the shell temperature at a reasonable level for shell strength. In a similar fashion as in the reactor, above the axially annular space 24 is mounted a multiport cyclone 25, 26, whose vanes are attached either to the cylindrical tube 5 or the pressure shell 6. The multiport cyclone is provided with a center tube 30 for the removal of the stack gas formed in the regenerator, while transfer channels 28 and 29 are provided by means of cylindricaltubes 5 and 6 for removal of the catalytic solids separated from the gas phase in the multiport cyclone.

The fluidization gas flow of the reactor is denoted in the diagram by reference numeral 8. The gas flow 8 enters the reaction space through a fluidization bottom 12 above which it is first mixed with the catalyst entering via a return channel 20 via a valve 31, and then higher in the reactor riser, with the feed flow 10 injected via nozzles 15 or fed using a screw feeder via channels 16 into the reaction space. The mixed gas flows 8 and 10 move in a gaseous phase along the axially annular riser 13 simultaneously carrying the entrained solids therewith into the louvered vanes 14 of the reactor cyclone. The catalyst releases heat into the feed vaporization and the reaction occurring in the axially annular riser 13, whereby its temperature falls. From the louvered vanes 14, the gas and entrained solids enter tangentially the interior of the inner reactor multiport cyclone chamber 17, where the solids are separated by impinging on cyclone inner wall 18 and falling into the solids transfer channels 19 and 20. When required, a portion of the solids can be returned as an overflow back to the reactor bottom section via an axially annular, internal recirculation channel 19. While the solids transfer channel 19 is not essential to the function of the apparatus, it may in some cases be advantageous to the reaction. In the solids transfer channel 20, the solids dribble downward in a dense phase, whereby the mixing of the gas flows between the reactor and the regenerator via the solids transfer channel 20 will be inhibited. The gas flow 8 entering the reactor multiport cyclone exits the reactor via the center tube 21 of the inner multiport cyclone. The solids flow from the reactor into the regenerator is controlled by means of a valve 31 equipped with a cylindrical control element, which is arranged mechanically movable by means of bars 32.

The regenerator is adapted about the reactor so that these units are separated from each other by a transfer channel 29 filled with solids in a dense phase. In a similar fashion with the reactor, the regenerator is located in the intershell riser space remaining between two cylindrical envelope surfaces formed by the apparatus shell and the reactor tube mounted inside the shell. Between said reactor tube and said outer cylindrical shell structure of the reactor is further mounted a cylindrical wall to provide said transfer channel 29. An oxygencontaining gas flow (e.g. air) 9 enters the solids reheater via a fluidizing distributor bottom 23 and rises in the axially annular riser channel 24 simultaneously therewith carrying the solids into the vanes 25 of the regenerator cyclone. In the reheater, coke possibly accumulated on the surface of the solids and organic compounds penetrated in the pores thereof are oxidized, that is, burned in the axially annular riser channel 24, whereby the solids temperature is elevated. The regenerator cyclone chamber 26 is located above the reactor proper. In the regenerator cyclone chamber 26, the solids are separated by impinging on the cyclone wall 27 and subsequently fall into transfer channels 28 and 29. The transfer channel 29 passes the catalytic solids back to the reactor. That excess portion of the solids which fails to enter the transfer or return channel will fall back to the regenerator bottom section as an overflow via the transfer channel 28. The particulate matter is advantageously kept in a fluidized state during its passage in the internal return channel, whereby a control valve is redundant. The stack gas 12 of the regenerator is removed via the central tube 30 of the regenerator cyclone. The solids dribbling slowly downward in the transfer channel 29 in a dense phase prevent communication between the gas spaces of the reactor and the regenerator. The solids flow rate from the regenerator to the reactor is controlled by moving the cylindrical control element of a valve 33 mechanically via bars 34 connected thereto.

Figure 2:
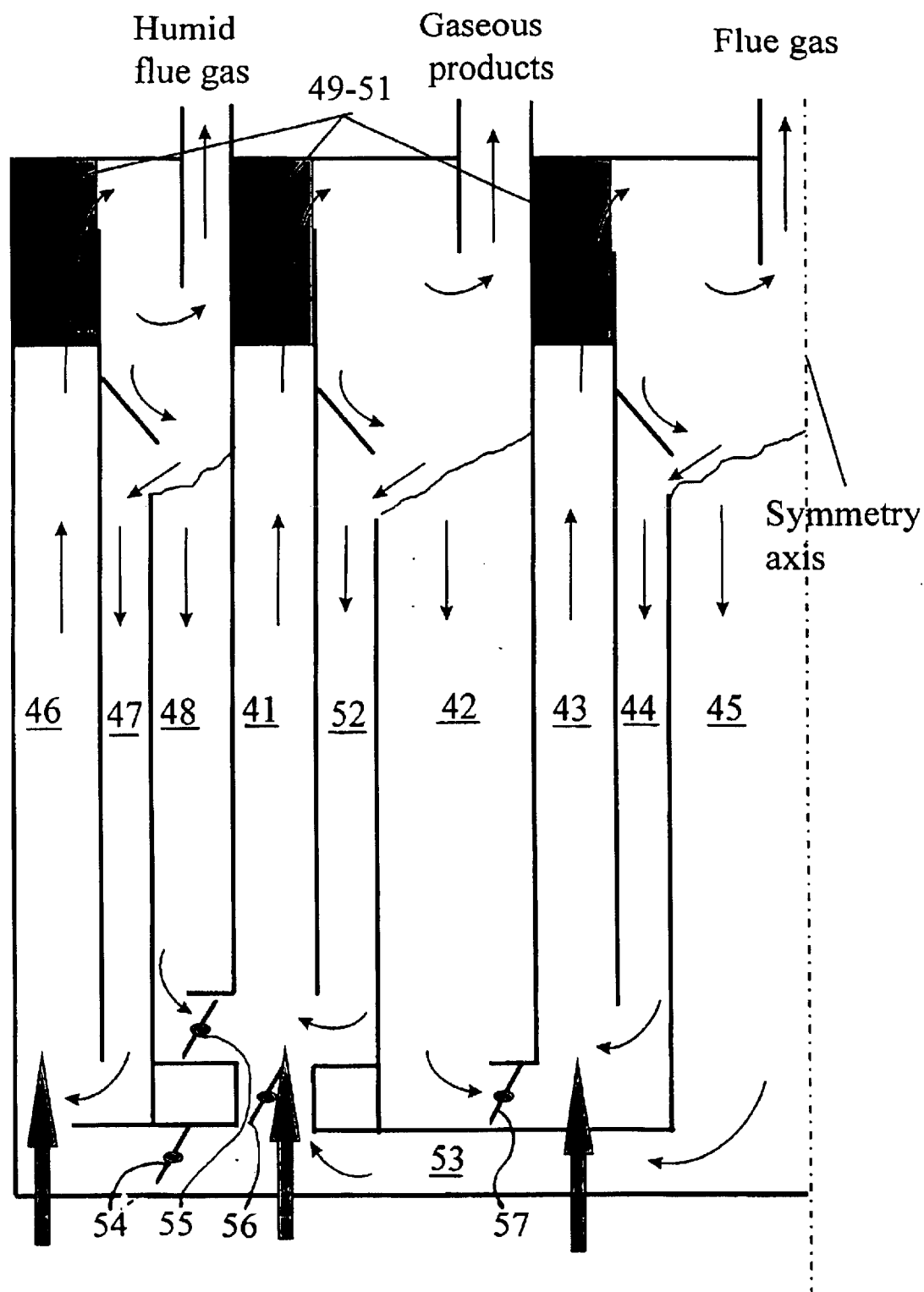
FIG. 2 shows a partial sectional view of a simplified structure of another preferred embodiment of the present invention.

For wet materials such as slurries, sawdust etc., comprising finely-divided solid matter, the embodiment shown in FIG. 2 can be used. It comprises a pyrolysis apparatus consisting of a reactor 41 and a dipleg 42. The reactor includes a channel 52 for internal recirculation of unreacted biomass and solids. Said channel is preferably fitted between the reactor and the dipleg. The axial cross-sections of the riser, the dipleg and the recirculation channel are annular. A regenerator or solids reheater 43 having an axially annular cross-section is concentrically fitted within the reaction unit 41, 42, 52. The regenerator includes a channel 44 for internal recirculation of treated matter and a central cylindrical dipleg 45 communicating with the riser of the reactor 41. A drier or drying unit 46–48 is concentrically fitted about the reaction unit 41, 42, 52. The construction of the drier is similar to that of the reactor and the regenerator comprising a channel for internal recirculation 47 having an axially annular cross-section and a dipleg 48 of similar cross-section.

Each of the risers having axially annular cross-sections are provided with multi-inlet cyclones 49–51 at the top (as a continuation of the tubes defining the risers), for separating solids and gas.

The connections and communicating channels between the drying unit, the reactor and the reheater are shown in FIG. 2. As readily seen, a channel 53 formed in the lower part of the apparatus will provide contact between the dipleg 45 of the reheater and the risers 41, 46 of the reactor and the drier. The riser of the reactor 41 is also connected to the dipleg of the drier 48. The flux of material between the diplegs of the various sections within said communicating channels are adjusted by means of control valves 54–57.

For fluidizing the solids in the reactor 41, flue gases obtained, for example, from the reheater can be used. Flue gases are also preferably used for drying of the feedstock. Air and possibly uncondensed pyrogases (from the reactor) can be fed into the reheater 43 for burning off pyrolysis products on the surface of the solids.

The gaseous products obtained from the reactor can be condensed in a condenser cascade (not shown) to produce liquid pyrolysis products, useful as, e.g., fuels.

EXAMPLE

Forestry residues are collected and shipped to the pyrolysis process plant. For the apparatus shown in FIG. 1, the feedstock is dried in a separate drier (not shown) to an appropriate moisture content, normally less than 15 weight percent and ground, chopped or hammered to an appropriate thickness and length before being fed into the reactor system by a screw feeder.

In the embodiment shown in FIG. 2, the wet feedstock is fed to the drying section, in which it is dried to desired moisture content, at least a part of the material being recirculated through channel 47. Humid flue gas is released from the drier and a part of the dried material is conducted via the dipleg to the reactor wherein it is mixed with the particulate heat transfer matter (e.g. sand).

Either flue gases from the sand reheater/regenerator 43 or non-condensible gases from the liquid collection section are compressed and fed into the reactor 41 for bed fluidization. The input material is fed into the reactor assembly at the bottom of the reactor at the point where the heated bed material is returned to the reactor.

In either alternative the input particles are then rapidly heated in 0.5 to 5 seconds to the operational temperature of 450 to 600° C. where they undergo the thermal conversion or pyrolysis reaction forming a mixture of condensible vapors, solids and noncondesible gases. The solid char and bed material are removed from the gas stream by a multi-inlet port cyclone and the pyrolysis vapors are directed into a series of condensers where the temperature is lowered from a temperature in the range of 450 to 600° C. to a final temperature of 40 to 60° C. The vapors are condensed and mixed to give a final yield of liquid from 50 to 75 weight percent. Non-condensible gases which are comprised mostly of carbone dioxide, carbon monoxide and methane are utilized in either the drier as a source of beat or the regenerator as a source of heat or as the fluidizing gas.

In the regenerator section 43, the bed material is heated by oxidising combustible solid char removed from the gas stream by the multi inlet port cyclone and also if desired by noncondensable gases from condensers. As fluidizing gas air (ambient air or hot humid air from drier) is used. Flue gases from regenerator is used for pyrolysis reactor fluidizing gas and/or for drying of feedstock together with solid char.

What is claimed is:

1. A process for thermal conversion of carbonaceous feedstocks selected from biomass and organic wastes, said process comprising:

feeding the feedstock into a drier, said drier comprising a riser having an axially annular cross section equipped with a multi-inlet cyclone for the separation of dried matter from vaporized gases and a dipleg;

feeding the feedstock to a fluidized-bed reactor, wherein the feedstock is converted at an elevated temperature under the influence of particulate matter kept in a fluidized state by a fluidizing gas, transferring the particulate matter from the reactor to a regenerator for regeneration and then recirculating the particulate matter to the reactor after the regeneration, and recovering the converted hydrocarbon products from the reactor, wherein said reactor comprises a riser having an axially annular cross section equipped with a multi-inlet cyclone for the separation of particulate matter, and wherein said regenerator is concentrically fitted around said reactor and wherein said regenerator comprises a riser having an axially annular cross section and equipped with a multi-inlet cyclone for separation of regenerated particulate matter; and said dipleg of the drier communicates with the riser of the regenerator.

2. The process according to 1, wherein the drier comprises a channel for internal circulation.

3. The process according to claim 1, wherein the regenerator comprises a dipleg which communicates with the riser of the drier.

4. The process according to claim 1, wherein the feedstock is thermally converted at a temperature of 400–1000° C.

5. An apparatus for thermally converting carbonaceous feedstock(s), said apparatus comprising a drying unit for drying the feedstock(s), a reaction unit in which the feedstock is contacted with heated, fluidized-state particulate matter, and a regenerator unit for regeneration of the particulate matter contaminated in thereaction unit, wherein wherein the drying unit comprises a riser fitted about the reaction unit in a symmetrically concentric fashion said riser having an axially annular cross section;

the reaction unit comprises a riser having an axially annular cross equipped with a multi-inlet cyclone for separating particulate matter from gas, and the regenerator unit comprises a riser and a dipleg fitted about the reaction unit in a symmetrically concentric fashion said riser having an axially annular cross section eguipped with a multi-inlet cyclone for separating particulate matter from gas, said dipleg of the regenerator unit communicating with the riser of the reaction unit and with drying unit.

6. The apparatus according to claim 5, wherein the drying unit comprises a dipleg having an axially annular cross section which communicates with the riser of the reaction unit.

7. The apparatus according to claim 5 or 6, wherein the riser of the drying unit is equipped with a gas and particulate matter separating means formed by a multi-inlet cyclone.

* * * * *